(12) United States Patent
Kometani et al.

(10) Patent No.: US 12,431,776 B2
(45) Date of Patent: Sep. 30, 2025

(54) PERMANENT MAGNET-TYPE ROTARY ELECTRIC MACHINE

(71) Applicants: Mitsubishi Electric Corporation, Tokyo (JP); OSAKA UNIVERSITY, Osaka (JP)

(72) Inventors: Haruyuki Kometani, Tokyo (JP); Ryoji Miyatake, Tokyo (JP); Takuro Yamada, Tokyo (JP); Kenji Tanaka, Tokyo (JP); Katsuhiro Hirata, Suita (JP); Noboru Niguchi, Suita (JP); Kazuaki Takahara, Suita (JP); Hironori Suzuki, Suita (JP); Takuya Ito, Suita (JP)

(73) Assignees: MITSUBISHI ELECTRIC CORPORATION, Tokyo (JP); OSAKA UNIVERSITY, Osaka (JP)

( * ) Notice: Subject to any disclaimer, the term of this patent is extended or adjusted under 35 U.S.C. 154(b) by 241 days.

(21) Appl. No.: 18/267,103

(22) PCT Filed: Dec. 23, 2020

(86) PCT No.: PCT/JP2020/048277
§ 371 (c)(1),
(2) Date: Jun. 14, 2023

(87) PCT Pub. No.: WO2022/137405
PCT Pub. Date: Jun. 30, 2022

(65) Prior Publication Data
US 2024/0120817 A1    Apr. 11, 2024

(51) Int. Cl.
*H02K 16/02* (2006.01)
*H02K 1/16* (2006.01)
(Continued)

(52) U.S. Cl.
CPC ............ *H02K 16/02* (2013.01); *H02K 1/16* (2013.01); *H02K 1/2706* (2013.01); *H02K 3/28* (2013.01); *H02K 2213/03* (2013.01)

(58) Field of Classification Search
CPC ............ H02K 3/28; H02K 1/16; H02K 1/165; H02K 1/2706; H02K 1/272; H02K 16/02
See application file for complete search history.

(56) References Cited

U.S. PATENT DOCUMENTS

2010/0283345 A1    11/2010   Atallah et al.
2011/0101906 A1*    5/2011   Tagome .................. H02K 3/28
                                            318/722
(Continued)

FOREIGN PATENT DOCUMENTS

CN    109075638 A    12/2018
EP    3118972 A1     1/2017
(Continued)

OTHER PUBLICATIONS

WO2020174936A1 Translation (Year: 2020).*
(Continued)

*Primary Examiner* — Oluseye Iwarere
*Assistant Examiner* — Nicholas Lee Setzer
(74) *Attorney, Agent, or Firm* — XSENSUS LLP

(57) ABSTRACT

A permanent magnet-type rotary electric machine includes a stator, a first rotor, and a second rotor. The stator includes a stator core, a plurality of stator teeth, a plurality of stator slots, a plurality of stator magnets, and a stator coil. The first rotor is disposed inside the stator core relative to the plurality of stator magnets. The second rotor is disposed inside the stator core relative to a plurality of first pole pieces. The second rotor includes a plurality of second pole pieces. A proportion of the number of the plurality of stator slots to the number of poles of the plurality of second pole (Continued)

pieces of the second rotor is greater than 1.25 and less than 1.5, or greater than 1.5 and less than 3.0.

7 Claims, 14 Drawing Sheets

(51) Int. Cl.
*H02K 1/2706* (2022.01)
*H02K 3/28* (2006.01)

(56) References Cited

U.S. PATENT DOCUMENTS

| | | | |
|---|---|---|---|
| 2011/0127869 A1* | 6/2011 | Atallah | H02K 49/06 |
| | | | 310/94 |
| 2016/0006304 A1 | 1/2016 | Tojima et al. | |
| 2018/0248432 A1* | 8/2018 | Ikeda | H02K 11/33 |
| 2019/0131840 A1* | 5/2019 | Tago | H02K 21/16 |
| 2020/0161948 A1* | 5/2020 | Ukaji | H02K 1/27 |
| 2022/0052596 A1 | 2/2022 | Ukaji et al. | |
| 2023/0026553 A1* | 1/2023 | Kometani | H02K 16/02 |
| 2023/0198319 A1* | 6/2023 | Yamada | H02K 15/03 |
| | | | 310/114 |

FOREIGN PATENT DOCUMENTS

| | | |
|---|---|---|
| EP | 3147542 A1 | 3/2017 |
| JP | 2009-535012 A | 9/2009 |
| JP | 2013-141400 A | 7/2013 |
| JP | 2014-163431 A | 9/2014 |
| JP | 2016-135014 A | 7/2016 |
| WO | 2007/125284 A1 | 11/2007 |
| WO | 2014/128985 A1 | 8/2014 |
| WO | 2015/137392 A1 | 9/2015 |
| WO | 2015/178111 A1 | 11/2015 |
| WO | 2017/073199 A1 | 5/2017 |
| WO | WO-2020174936 A1 * | 9/2020 ............. H02K 7/116 |

OTHER PUBLICATIONS

Extended European Search Report issued Jan. 29, 2024, in corresponding European Patent Application No. 20966895.3, 9 pages.
International Search Report and Written Opinion mailed on Feb. 22, 2021, received for PCT Application PCT/JP2020/048277, filed on Dec. 23, 2020, 9 pages including English Translation.
Notice of Reasons for Refusal mailed on Sep. 14, 2021, received for JP Application 2021-532967, 7 pages including English Translation.

* cited by examiner

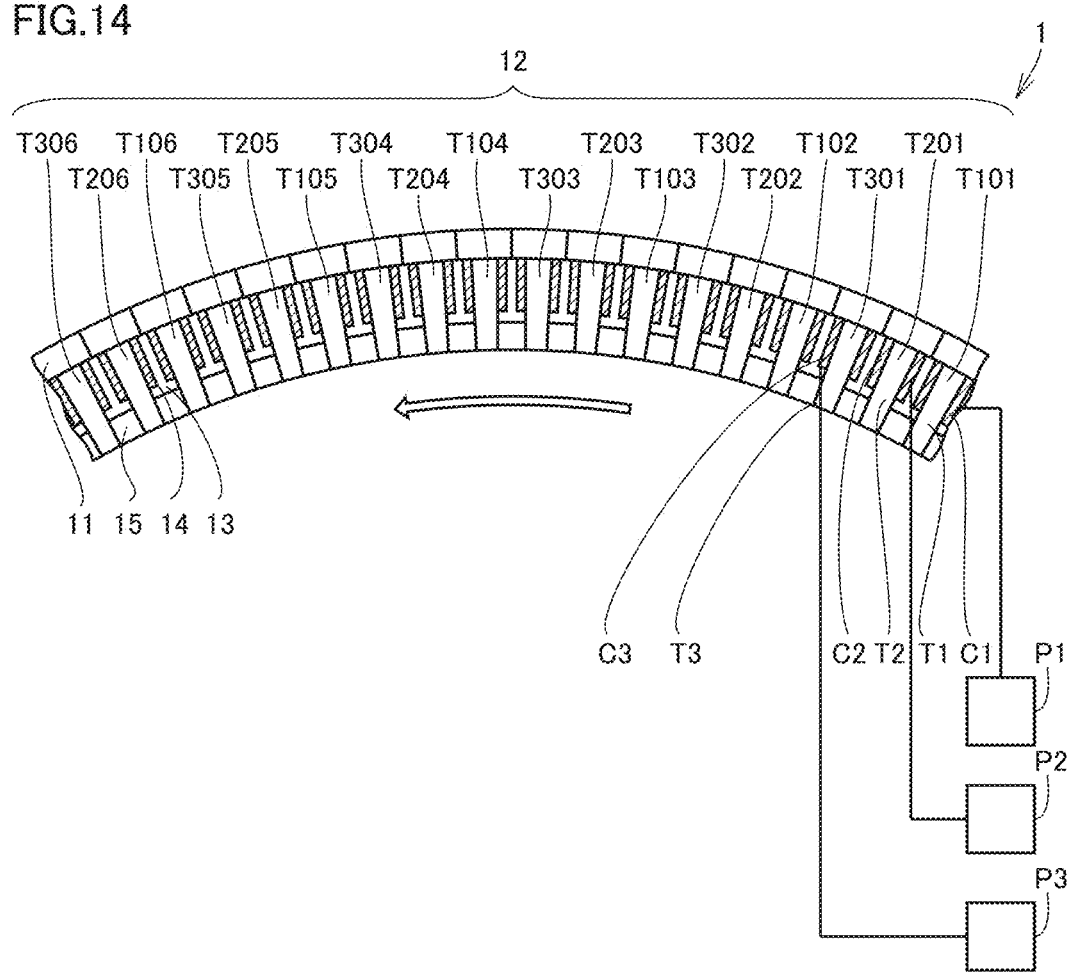

PERMANENT MAGNET-TYPE ROTARY ELECTRIC MACHINE

CROSS-REFERENCE TO RELATED APPLICATION

The present application is based on PCT filing PCT/JP2020/048277, filed Dec. 23, 2020, the entire contents of which are incorporated herein by reference.

TECHNICAL FIELD

The present disclosure relates to a permanent magnet-type rotary electric machine.

BACKGROUND ART

A rotary electric machine capable of changing a rotation speed of a rotor in a state where a stator and the rotor are not in contact with each other is known. For example, Japanese Patent Laying-Open No. 2016-135014 (PTL 1) discloses a rotary electric machine that functions as a magnetic wave gear device. The magnetic wave gear device disclosed in PTL 1 includes a stator (stator), a low-speed rotor (first rotor) that rotates at a low speed, and a high-speed rotor (second rotor) that rotates at a high speed according to a gear ratio. The stator, the low-speed rotor, and the high-speed rotor are arranged around a rotation axis in this order from an outer peripheral side. The stator includes a coil. The coil is a coil for outputting generated electric power or a coil for controlling generated torque.

The magnetic wave gear device disclosed in PTL 1 is capable of changing the speed of the high-speed rotor in a state where the high-speed rotor and the low-speed rotor are not in contact with the stator, so that it is possible to reduce maintenance for dealing with mechanical wear and the like. This reduces a maintenance load. Further, a case where the magnetic wave gear device is used as a generator eliminates the need of a mechanical transmission, so that it is possible to downsize a power generation system.

CITATION LIST

Patent Literature

PTL 1: Japanese Patent Laying-Open No. 2016-135014

SUMMARY OF INVENTION

Technical Problem

In the permanent magnet-type rotary electric machine (magnetic wave gear device) disclosed in PTL 1, the stator coil (coil), however, is wound around the stator (stator) as a distributed winding. An increase in capacity of the stator coil wound by the distributed winding causes a reduction in workability on the stator coil. Therefore, an increase in capacity of the permanent magnet-type rotary electric machine disclosed in PTL 1 causes a reduction in workability on the stator coil. Further, an increase in capacity of the stator coil wound by a concentrated winding prevents the reduction in workability on the stator coil. Therefore, in order to prevent the reduction in workability on the stator coil, it is preferable that the stator coil of the permanent magnet-type rotary electric machine disclosed in PTL 1 is wound as a concentrated winding. The concentrated winding, however, may cause torque pulsation in a manner that depends on the number of turns of the concentrated winding or the like.

Further, in a permanent magnet-type rotary electric machine of a concentrated-winding type, an index called a winding factor indicating a proportion of magnetic flux that is generated from a second pole piece (permanent magnet) and linked with a stator coil is used for evaluating efficiency or power density. The greater the winding factor, the more effectively the magnetic flux generated from the second pole piece is linked with the stator coil, so that the efficiency or the power density of the permanent magnet-type rotary electric machine becomes larger. In a permanent magnet-type rotary electric machine having a transmission mechanism like the permanent magnet-type rotary electric machine disclosed in PTL 1, the efficiency or the power density, however, is also affected by a speed increase/reduction ratio. Therefore, with only the winding factor taken into consideration, the efficiency or the power density may not sufficiently increase.

The present disclosure has been made in view of the above-described problems, and it is therefore an object of the present disclosure to provide a permanent magnet-type rotary electric machine capable of preventing the occurrence of torque pulsation and sufficiently increasing efficiency or power density.

Solution to Problem

A permanent magnet-type rotary electric machine of the present disclosure includes a stator, a first rotor, and a second rotor. The stator includes a stator core, a plurality of stator teeth, a plurality of stator slots, a plurality of stator magnets, and a stator coil. The stator core extends annularly. The stator teeth protrude from the stator core toward a center of the stator core. The plurality of stator slots are each provided between adjacent stator teeth of the plurality of stator teeth. The plurality of stator magnets are each installed in a corresponding one of the plurality of stator slots. The stator coil is wound around each of the plurality of stator teeth. The first rotor is disposed inside the stator core relative to the plurality of stator magnets. The first rotor includes a plurality of first pole pieces. The plurality of first pole pieces are arranged along a circumferential direction of the stator core with a space from the stator. The second rotor is disposed inside the stator core relative to the plurality of first pole pieces. The second rotor includes a plurality of second pole pieces. The plurality of second pole pieces are arranged along the circumferential direction of the stator core with a space from the first rotor. The plurality of second pole pieces have a permanent magnet. The stator coil is wound around each of the plurality of stator teeth as a concentrated winding. A proportion of the number of the plurality of stator slots to the number of poles of the plurality of second pole pieces of the second rotor is greater than 1.25 and less than 1.5, or greater than 1.5 and less than 3.0.

Advantageous Effects of Invention

In the permanent magnet-type rotary electric machine of the present disclosure, the proportion of the number of the plurality of stator slots to the number of poles of the plurality of second pole pieces of the second rotor is greater than 1.25 and less than 1.5, or greater than 1.5 and less than 3.0. It is therefore possible to prevent the occurrence of torque pulsation and sufficiently increase the efficiency or the power density.

BRIEF DESCRIPTION OF DRAWINGS

FIG. 14 is a schematic diagram schematically illustrating configurations of a stator, a first power supply, a second power supply, and a third power supply of the permanent magnet-type rotary electric machine according to the fifth embodiment.

DESCRIPTION OF EMBODIMENTS

Figure 1:
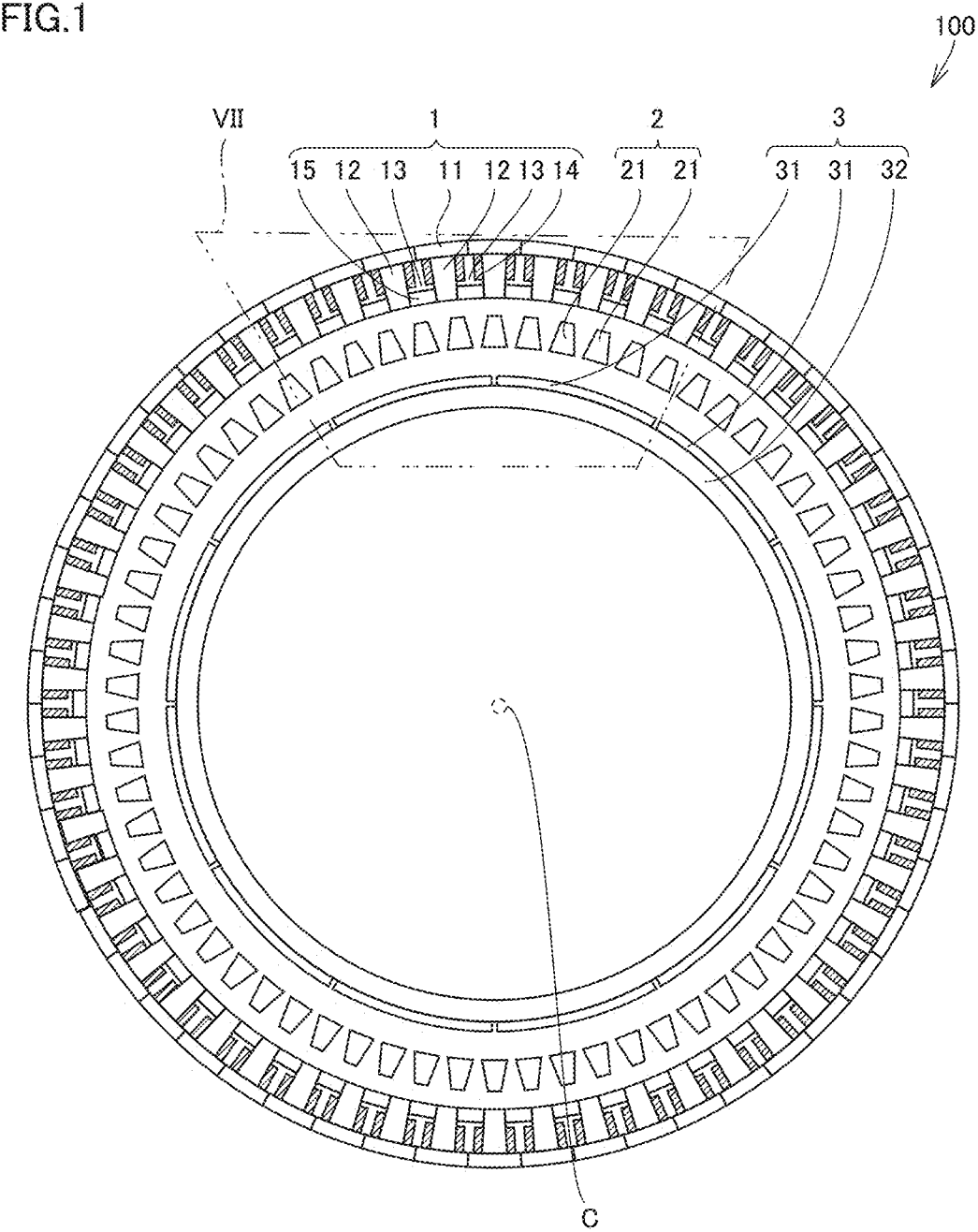
FIG. 1 is a schematic diagram schematically illustrating a configuration of a permanent magnet-type rotary electric machine according to a first embodiment.

Hereinafter, embodiments will be described with reference to the drawings. Note that, in the following description, the same or corresponding portions are denoted by the same reference numerals to avoid the description from being redundant.

First Embodiment

A configuration of a permanent magnet-type rotary electric machine 100 according to a first embodiment will be described with reference to FIG. 1. In the present embodiment, a configuration and operation in a case where permanent magnet-type rotary electric machine 100 is used as a generator will be described, but the configuration of permanent magnet-type rotary electric machine 100 is also applicable to a case where permanent magnet-type rotary electric machine 100 is used as an electric motor.

Permanent magnet-type rotary electric machine 100 according to the present embodiment is permanent magnet-type rotary electric machine 100 having a transmission mechanism. Permanent magnet-type rotary electric machine 100 is permanent magnet-type rotary electric machine 100 of a three-phase winding type.

As illustrated in FIG. 1, permanent magnet-type rotary electric machine 100 includes a stator 1, a first rotor 2, and a second rotor 3. Stator 1, first rotor 2, and second rotor 3 are concentrically arranged.

Stator 1 includes a stator core 11, a plurality of stator teeth 12, a plurality of stator slots 13, a plurality of stator magnets 15, and a stator coil 14. Note that, in FIG. 1 and the like, stator coil 14 is indicated by hatching. The number of the plurality of stator teeth 12, the number of the plurality of stator slots 13, and the number of the plurality of stator magnets 15 are identical to each other.

Stator core 11 extends annularly. A center of first rotor 2 and a center of second rotor 3 coincide with a center C of stator core 11. Stator teeth 12 extend from stator core 11 toward center C of stator core 11. The plurality of stator slots 13 are each provided between adjacent stator teeth 12 of the plurality of stator teeth 12. Stator coil 14 is wound around each of the plurality of stator teeth 12. Stator coil 14 is wound around each of the plurality of stator teeth 12 as a concentrated winding. That is, permanent magnet-type rotary electric machine 100 according to the present embodiment is a permanent magnet-type rotary electric machine of a concentrated-winding type.

The plurality of stator magnets 15 are each installed in a corresponding one of the plurality of stator slots 13. The plurality of stator magnets 15 are each interposed between adjacent stator teeth 12 of the plurality of stator teeth 12. The plurality of stator magnets 15 are each magnetized. A direction of a polarity of each of the plurality of stator magnets 15 coincides with a radial direction of stator core 11. Therefore, for example, in a case where a side of the plurality of stator magnets 15 adjacent to center C of stator core 11 is an N pole, a side of the plurality of stator teeth 12 adjacent to center C of stator core 11 is an S pole.

One stator magnet 15 and one stator tooth 12 constitute a pair of magnetic poles. Since the number of the plurality of stator teeth 12, the number of the plurality of stator slots 13, and the number of the plurality of stator magnets 15 are identical to each other, stator 1 has the same number of pole pairs as the number of the plurality of stator slots 13. In the present embodiment, the number of the plurality of stator slots 13 is $N_S$. In permanent magnet-type rotary electric machine 100 illustrated in FIG. 1, $N_S$ is 54. Note that the number of the plurality of stator slots 13 may be referred to as the number of slots.

First rotor 2 is disposed inside stator core 11 relative to the plurality of stator magnets 15. In the present embodiment, first rotor 2 is configured as a low-speed rotor. First rotor 2 includes a plurality of first pole pieces 21. The plurality of first pole pieces 21 are arranged along a circumferential direction of stator core 11 with a space from stator 1. The plurality of first pole pieces 21 are annularly arranged. In the present embodiment, the number of the plurality of first pole pieces 21 is $N_L$. In permanent magnet-type rotary electric machine 100 illustrated in FIG. 1, $N_L$ is 66.

Second rotor 3 is disposed inside stator core 11 relative to the plurality of first pole pieces 21. In the present embodiment, second rotor 3 is configured as a high-speed rotor. Second rotor 3 includes a plurality of second pole pieces 31 and a support portion 32. The plurality of second pole pieces 31 are arranged along the circumferential direction of stator core 11 with a space from first rotor 2. The plurality of second pole pieces 31 are annularly arranged. The plurality of second pole pieces 31 are supported by support portion 32. The plurality of second pole pieces 31 are arranged on an outer periphery of support portion 32.

The plurality of second pole pieces 31 have a permanent magnet. In the present embodiment, the number of the plurality of second pole pieces 31 is $N_H$. Therefore, the number of pole pairs of the plurality of second pole pieces 31 is $N_H$. Therefore, the number of poles of the plurality of second pole pieces 31 is $2N_H$. In permanent magnet-type rotary electric machine 100 illustrated in FIG. 1, $N_H$ is 12.

A proportion ($N_S/(2N_H)$) of the number of the plurality of stator slots 13 to the number of poles of the plurality of second pole pieces 31 of second rotor 3 is greater than 1.25 and less than 1.5, or greater than 1.5 and less than 3.0. In the present embodiment, the proportion of the number of the plurality of stator slots 13 to the number of poles of the plurality of second pole pieces 31 of second rotor 3 is expressed as $N_S/(2N_H)$. Alternatively, the proportion of the number of the plurality of stator slots 13 to the number of poles of the plurality of second pole pieces 31 of second rotor 3 may be expressed as the number of slots/the number of poles.

Next, a configuration of permanent magnet-type rotary electric machine 100 according to the first embodiment as a transmission will be described.

Stator 1, first rotor 2, and second rotor 3 are configured as a transmission. Specifically, in a case where the number $N_S$ of the plurality of stator slots 13, the number $N_L$ of the plurality of first pole pieces 21, and the number $N_H$ of the plurality of second pole pieces 31 satisfy a relation of the following Expression 1, stator 1, first rotor 2, and second rotor 3 function as a transmission.

[Math. 1]

$$N_L = N_S \pm N_H \quad \text{Expression 1}$$

In the present embodiment, the number $N_S$ of the plurality of stator slots 13, the number $N_L$ of the plurality of first pole pieces 21, and the number $N_H$ of the plurality of second pole pieces 31 satisfy the relation of Expression 1 described above. Therefore, stator 1, first rotor 2, and second rotor 3 function as a transmission. Negative torque is generated in a plurality of the first rotors 2 by interaction between a magnetic force of the plurality of stator magnets 15 and a magnetic force of the plurality of two rotors. On the other hand, when first rotor 2 is rotated by external power, input is given to first rotor 2.

In a state where the input is given to first rotor 2, a current flows through stator 1 so as to cause second rotor 3 to rotate in a free-run state. Note that the free-run state is a state where the rotor is rotatable by inertia. In a case where $N_L = N_S + N_H$ is satisfied in Expression 1, second rotor 3 rotates at a speed $N_L/N_H$ times the speed of first rotor 2. As a result, permanent magnet-type rotary electric machine 100 functions as a transmission. Further, when second rotor 3 rotates at a rotation speed $N_L/N_H$ times the speed of first rotor 2, an induced electromotive force is generated in stator coil 14. As a result, generated power is output from stator coil 14.

A speed increase/reduction ratio is a ratio of the rotation speed of second rotor 3 to the rotation speed of first rotor 2. The speed increase/reduction ratio, the number of the plurality of stator slots 13, and the number of the plurality of second rotors 3 satisfy the relation of the following Expression 2.

[Math. 2]

$$K_H = \frac{N_L}{N_H} \quad \text{Expression 2}$$

Next, efficiency or power density of permanent magnet-type rotary electric machine 100 will be described.

A proportion of magnetic flux that is generated from the plurality of magnetic pole pieces and contributes to the power generation of stator coil 14 is referred to as a winding factor. At least some of the magnetic flux generated from the plurality of second pole pieces 31 is linked with stator coil 14, so that the magnetic flux generated from the plurality of second pole pieces 31 contribute to the power generation of stator coil 14. Therefore, the winding factor in the present embodiment is a proportion of the magnetic flux that is generated from the plurality of second pole pieces 31 and contributes to the power generation of stator coil 14. The winding factor is expressed by the following Expression 3.

[Math. 3]

$$K_w = \left| \sin\frac{\beta}{2} \frac{\sin\frac{n\pi}{6}}{q'\sin\frac{n\pi q'}{6}} \right| \quad \text{Expression 3}$$

n represents the order of space harmonics. Further, the fundamental wave of the order of space harmonics is 1. Further, $\beta$ represents a pitch degree. The pitch degree is expressed by the following Expression 4.

[Math. 4]

$$\beta = \pi \frac{2N_H}{N_S} \quad \text{Expression 4}$$

q' represents the number of slots for each pole and each phase. In the present embodiment, the number of phases is 3. It is expressed by the following Expression 5, and in a case where the right side of Expression 5 is a decimal fraction, the value of the right side is multiplied by an integer to obtain the smallest integer.

[Math. 5]

$$q' = \pi \frac{N_S}{6N_H} \quad \text{Expression 5}$$

For a permanent magnet-type rotary electric machine in the related art according to a comparative example that includes a stator coil 14 of a concentrated-winding type and does not include a transmission mechanism, efficiency or power of the permanent magnet-type rotary electric machine is evaluated on the basis of the winding factor. It is therefore evaluated that the larger the winding factor, the higher the efficiency or power density of the permanent magnet-type rotary electric machine. That is, only the winding factor is used as an index for evaluating the permanent magnet-type rotary electric machine.

For permanent magnet-type rotary electric machine 100 including a transmission mechanism like permanent magnet-type rotary electric machine 100 according to the present embodiment, it is further necessary to take the speed increase/reduction ratio of second rotor 3 into consideration. The winding factor and the speed increase/reduction ratio are each calculated on the basis of the number of stator teeth 12 and the number of the poles of second pole pieces 31. Therefore, in a case where the number of stator teeth 12 and the number of the poles of second pole pieces 31 are determined with only the improvement of the winding factor taken into consideration, there is a possibility that a necessary speed increase/reduction ratio is not obtained.

Therefore, for permanent magnet-type rotary electric machine 100 according to the present embodiment, the efficiency or power of permanent magnet-type rotary electric machine 100 is evaluated on the basis of the winding factor×the speed increase/reduction ratio. That is, the winding factor×the speed increase/reduction ratio is used as an index for evaluating permanent magnet-type rotary electric machine 100.

Specifically, when the amount of magnet of second rotor 3 (the amount of magnetic flux generated from the plurality of second pole pieces 31) is the same, an induced voltage generated in stator coil 14 is proportional to the winding factor×the speed increase/reduction ratio. Therefore, the efficiency or power density of permanent magnet-type rotary electric machine 100 increases in response to an increase in the winding factor×the speed increase/reduction ratio.

Next, a relation between the winding factor, the speed increase/reduction ratio, and the winding factor×the speed increase/reduction ratio, and $N_S/(2N_H)$ will be described in detail with reference to FIGS. 2 to 6.

Figure 2:
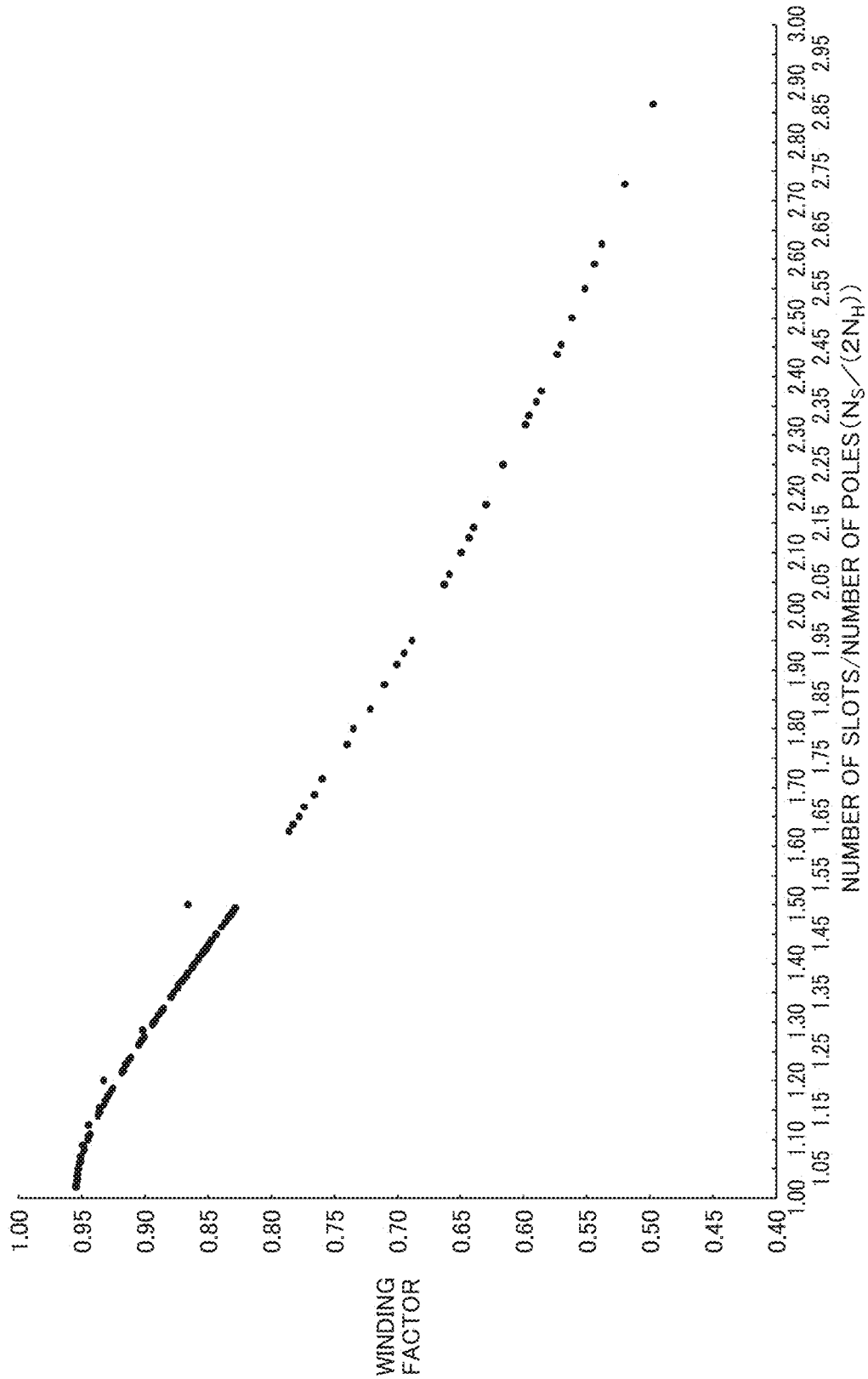
FIG. 2 is a graph schematically showing a relation between the number of slots/the number of poles and a winding factor according to the first embodiment.
Figure 3:
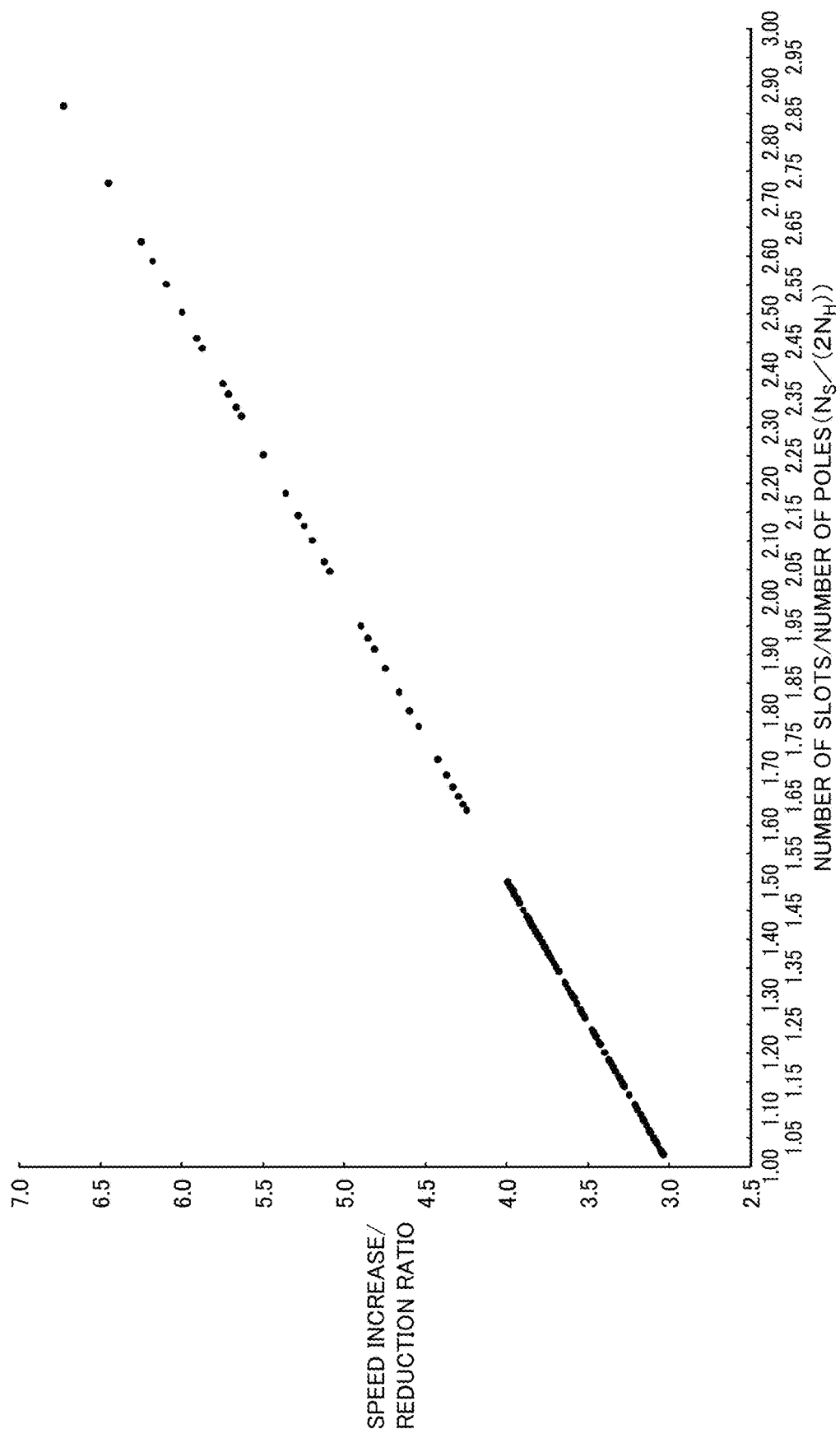
FIG. 3 is a graph schematically showing a relation between the number of slots/the number of poles and a speed increase/reduction ratio according to the first embodiment.

FIG. 2 is a graph showing a relation between $N_S/(2N_H)$ and the winding factor. As shown in FIG. 2, as $N_S/(2N_H)$ decreases, the winding factor increases. Therefore, in a case where only the improvement of the winding factor is taken into consideration, it is desirable that $N_S/(2N_H)$ be small. FIG. 3 is a graph showing a relation between $N_S/2N_H$ and the speed increase/reduction ratio. As shown in FIG. 3, as $N_S/(2N_H)$ increases, the speed increase/reduction ratio increases.

Figure 4:
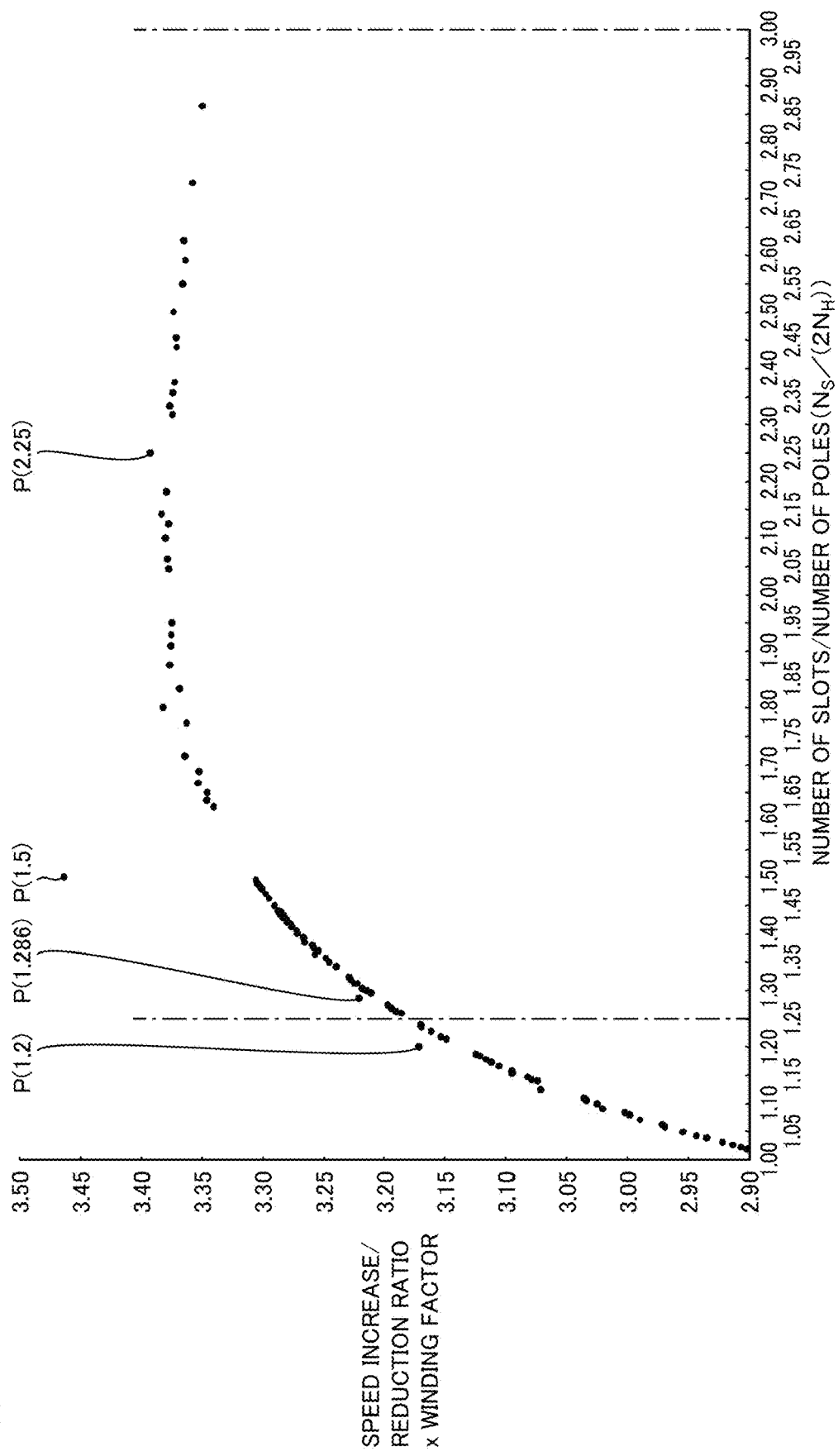
FIG. 4 is a graph schematically showing a relation between the number of slots/the number of poles and the winding factor×the speed increase/reduction ratio according to the first embodiment.

FIG. 4 is a graph showing a relation between $N_S/(2N_H)$ and the winding factor×the speed increase/reduction ratio. A range of $N_L/2N_S$ according to the present embodiment is a range surrounded by a long dashed short dashed line. Note that a point of $N_S/(2N_H)=1.5$ does not fall within the range of $N_S/(2N_H)$ according to the present embodiment.

As shown in FIG. 4, in a range where $N_S/(2N_H)$ is greater than 1.25 and smaller than 1.5, the winding factor×the speed increase/reduction ratio tends to increase as $N_S/(2N_H)$ increases. In a case where $N_S/(2N_H)$ is 1.2, the winding factor×the speed increase/reduction ratio is remarkably large relative to the upward trend. In FIG. 4, a point P (1.2) corresponds to a case where $N_S/(2N_H)$ is 1.2. Specifically, as shown in Table 1, the winding factor×the speed increase/reduction ratio in a case where $N_S/(2N_H)$ is 1.2 is, for example, 3.17.

TABLE 1

| $N_S/(2N_H)$ | Winding factor | Speed increase/ reduction ratio | Winding factor × speed increase/ reduction ratio |
| --- | --- | --- | --- |
| 1.020 | 0.95 | 3.04 | 2.90 |
| 1.023 | 0.95 | 3.05 | 2.91 |
| 1.026 | 0.95 | 3.05 | 2.91 |
| 1.031 | 0.95 | 3.06 | 2.92 |
| 1.038 | 0.95 | 3.08 | 2.93 |
| 1.043 | 0.95 | 3.09 | 2.94 |
| 1.050 | 0.95 | 3.10 | 2.95 |
| 1.050 | 0.95 | 3.10 | 2.95 |
| 1.059 | 0.95 | 3.12 | 2.97 |
| 1.063 | 0.95 | 3.13 | 2.97 |
| 1.071 | 0.95 | 3.14 | 2.99 |
| 1.080 | 0.95 | 3.16 | 3.00 |
| 1.083 | 0.95 | 3.17 | 3.00 |
| 1.091 | 0.95 | 3.18 | 3.02 |
| 1.100 | 0.95 | 3.20 | 3.03 |
| 1.105 | 0.95 | 3.21 | 3.03 |
| 1.109 | 0.94 | 3.22 | 3.04 |
| 1.125 | 0.95 | 3.25 | 3.07 |
| 1.140 | 0.94 | 3.28 | 3.07 |
| 1.143 | 0.94 | 3.29 | 3.08 |
| 1.147 | 0.94 | 3.29 | 3.08 |
| 1.154 | 0.94 | 3.31 | 3.10 |
| 1.159 | 0.93 | 3.32 | 3.10 |
| 1.167 | 0.93 | 3.33 | 3.11 |
| 1.174 | 0.93 | 3.35 | 3.11 |
| 1.179 | 0.93 | 3.36 | 3.12 |
| 1.184 | 0.93 | 3.37 | 3.12 |
| 1.188 | 0.93 | 3.38 | 3.12 |
| 1.200 | 0.93 | 3.40 | 3.17 |
| 1.214 | 0.92 | 3.43 | 3.15 |
| 1.219 | 0.92 | 3.44 | 3.15 |
| 1.227 | 0.92 | 3.45 | 3.16 |
| 1.235 | 0.91 | 3.47 | 3.17 |
| 1.239 | 0.91 | 3.48 | 3.17 |

The speed increase/reduction ratio in a case where $N_S/(2N_H)$ is 1.2 is, however, not sufficiently large. Further, the winding factor×the speed increase/reduction ratio in a case where $N_S/(2N_H)$ is 1.239 is, for example, 3.17. Therefore, the winding factor×the speed increase/reduction ratio in a case where $N_S/(2N_H)$ is 1.239 is approximately identical to the winding factor×the speed increase/reduction ratio in a case where $N_S/(2N_H)$ is 1.2. Further, as shown in Table 2, the winding factor×the speed increase/reduction ratio in a case where $N_S/(2N_H)$ is 1.260 is, for example, 3.19.

TABLE 2

| $N_S/(2N_H)$ | Winding factor | Speed increase/ reduction ratio | Winding factor × speed increase/ reduction ratio |
| --- | --- | --- | --- |
| 1.260 | 0.91 | 3.52 | 3.19 |
| 1.263 | 0.90 | 3.53 | 3.19 |
| 1.269 | 0.90 | 3.54 | 3.19 |
| 1.275 | 0.90 | 3.55 | 3.20 |
| 1.286 | 0.90 | 3.57 | 3.22 |
| 1.295 | 0.89 | 3.59 | 3.21 |
| 1.300 | 0.89 | 3.60 | 3.22 |
| 1.304 | 0.89 | 3.61 | 3.22 |
| 1.313 | 0.89 | 3.63 | 3.23 |
| 1.313 | 0.89 | 3.63 | 3.22 |
| 1.320 | 0.89 | 3.64 | 3.23 |
| 1.324 | 0.89 | 3.65 | 3.23 |
| 1.342 | 0.88 | 3.68 | 3.24 |
| 1.350 | 0.88 | 3.70 | 3.25 |
| 1.357 | 0.87 | 3.71 | 3.25 |
| 1.364 | 0.87 | 3.73 | 3.26 |
| 1.370 | 0.87 | 3.74 | 3.25 |
| 1.375 | 0.87 | 3.75 | 3.26 |
| 1.380 | 0.87 | 3.76 | 3.26 |
| 1.385 | 0.87 | 3.77 | 3.27 |
| 1.393 | 0.86 | 3.79 | 3.27 |
| 1.400 | 0.86 | 3.80 | 3.27 |
| 1.406 | 0.86 | 3.81 | 3.27 |
| 1.412 | 0.86 | 3.82 | 3.28 |
| 1.417 | 0.85 | 3.83 | 3.28 |
| 1.421 | 0.85 | 3.84 | 3.28 |
| 1.425 | 0.85 | 3.85 | 3.28 |

TABLE 2-continued

| $N_S/(2N_H)$ | Winding factor | Speed increase/ reduction ratio | Winding factor × speed increase/ reduction ratio |
|---|---|---|---|
| 1.429 | 0.85 | 3.86 | 3.28 |
| 1.432 | 0.85 | 3.86 | 3.28 |
| 1.435 | 0.85 | 3.87 | 3.29 |
| 1.438 | 0.85 | 3.88 | 3.29 |
| 1.440 | 0.85 | 3.88 | 3.29 |
| 1.450 | 0.84 | 3.90 | 3.29 |
| 1.463 | 0.84 | 3.93 | 3.30 |
| 1.470 | 0.84 | 3.94 | 3.30 |
| 1.479 | 0.83 | 3.96 | 3.30 |
| 1.483 | 0.83 | 3.97 | 3.30 |
| 1.489 | 0.83 | 3.98 | 3.30 |
| 1.494 | 0.83 | 3.99 | 3.31 |

Therefore, the winding factor×the speed increase/reduction ratio in a case where $N_S/(2N_H)$ is 1.260 is greater than the winding factor×the speed increase/reduction ratio in a case where $N_S/(2N_H)$ is 1.2. Therefore, the winding factor×the speed increase/reduction ratio in a case where $N_S/(2N_H)$ is 1.25 is greater than the winding factor×the speed increase/reduction ratio in a case where $N_S/(2N_H)$ is 1.2. Further, the speed increase/reduction ratio in a case where $N_S/(2N_H)$ is 1.25 is greater than the speed increase/reduction ratio in a case where $N_S/(2N_H)$ is 1.2. Therefore, the speed increase/reduction ratio is sufficiently large. It is therefore preferable that $N_S/(2N_H)$ be greater than 1.25.

In a case where $N_S/(2N_H)$ is 1.5, the winding factor×the speed increase/reduction ratio is remarkably large. In FIG. 4, a point P (1.5) corresponds to a case where $N_S/(2N_H)$ is 1.5.

Specifically, as shown in Table 3, the winding factor×the speed increase/reduction ratio in a case where $N_S/(2N_H)$ is 1.5 is, for example, 3.46.

TABLE 3

| $N_S/(2N_H)$ | Winding factor | Speed increase/ reduction ratio | Winding factor × speed increase/ reduction ratio |
|---|---|---|---|
| 1.500 | 0.87 | 4.00 | 3.46 |
| 1.625 | 0.79 | 4.25 | 3.34 |
| 1.636 | 0.78 | 4.27 | 3.35 |
| 1.650 | 0.78 | 4.30 | 3.35 |
| 1.667 | 0.77 | 4.33 | 3.35 |
| 1.688 | 0.77 | 4.38 | 3.35 |
| 1.714 | 0.76 | 4.43 | 3.36 |
| 1.773 | 0.74 | 4.55 | 3.36 |
| 1.800 | 0.74 | 4.60 | 3.38 |
| 1.833 | 0.72 | 4.67 | 3.37 |
| 1.875 | 0.71 | 4.75 | 3.38 |
| 1.875 | 0.71 | 4.75 | 3.38 |
| 1.875 | 0.71 | 4.75 | 3.38 |
| 1.909 | 0.70 | 4.82 | 3.38 |
| 1.929 | 0.69 | 4.86 | 3.38 |
| 1.950 | 0.69 | 4.90 | 3.38 |
| 2.045 | 0.66 | 5.09 | 3.38 |
| 2.063 | 0.66 | 5.13 | 3.38 |
| 2.100 | 0.65 | 5.20 | 3.38 |
| 2.125 | 0.64 | 5.25 | 3.38 |
| 2.143 | 0.64 | 5.29 | 3.38 |
| 2.182 | 0.63 | 5.36 | 3.38 |
| 2.250 | 0.62 | 5.50 | 3.39 |
| 2.318 | 0.60 | 5.64 | 3.37 |
| 2.333 | 0.60 | 5.67 | 3.38 |
| 2.357 | 0.59 | 5.71 | 3.37 |
| 2.375 | 0.59 | 5.75 | 3.37 |
| 2.438 | 0.57 | 5.88 | 3.37 |
| 2.455 | 0.57 | 5.91 | 3.37 |
| 2.500 | 0.56 | 6.00 | 3.37 |
| 2.550 | 0.55 | 6.10 | 3.37 |
| 2.591 | 0.54 | 6.18 | 3.36 |

TABLE 3-continued

| $N_S/(2N_H)$ | Winding factor | Speed increase/ reduction ratio | Winding factor × speed increase/ reduction ratio |
|---|---|---|---|
| 2.625 | 0.54 | 6.25 | 3.37 |
| 2.727 | 0.52 | 6.45 | 3.36 |
| 2.864 | 0.50 | 6.73 | 3.35 |

Figure 5:
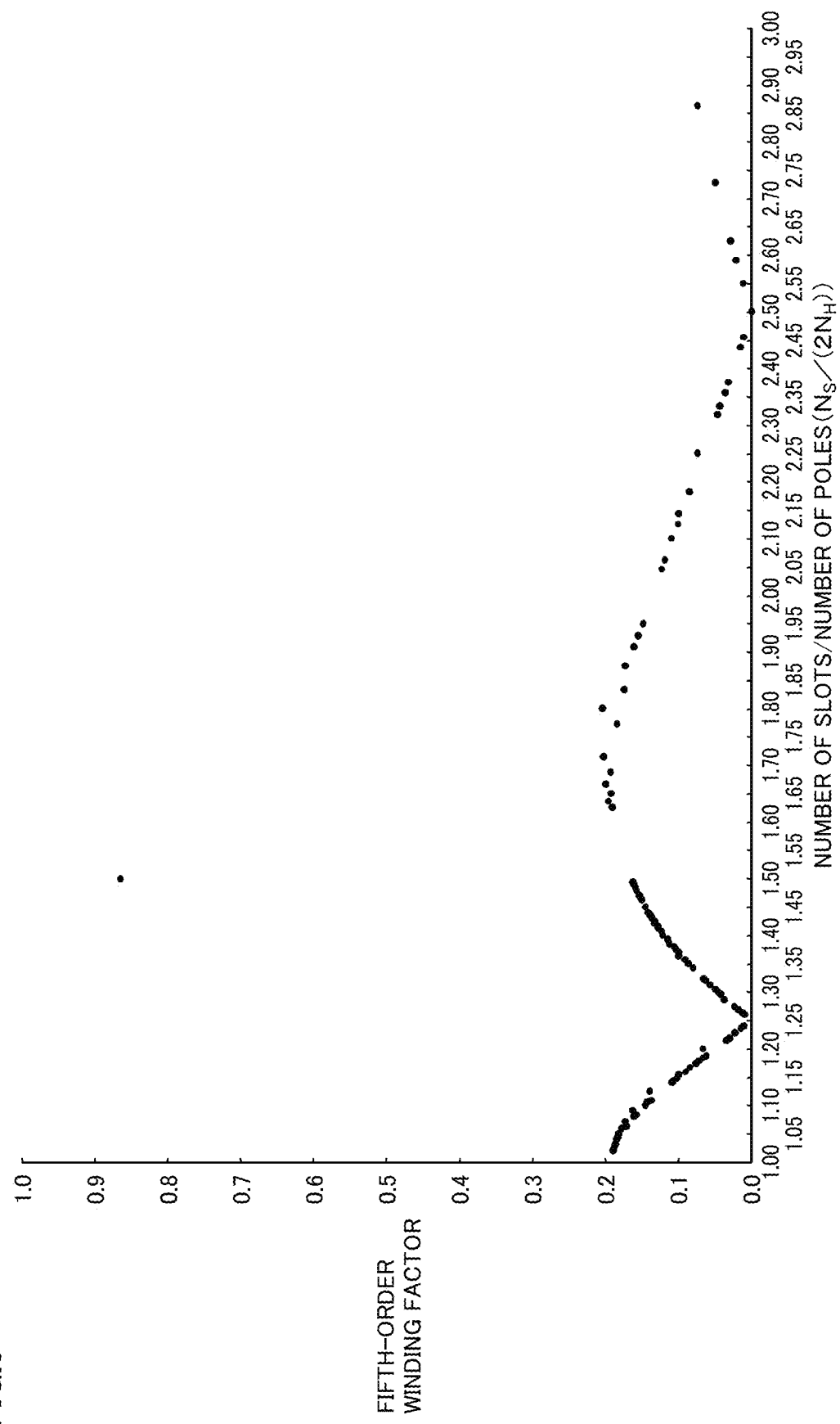
FIG. 5 is a graph schematically showing a relation between the number of slots/the number of poles and a fifth-order winding factor according to the first embodiment.
Figure 6:
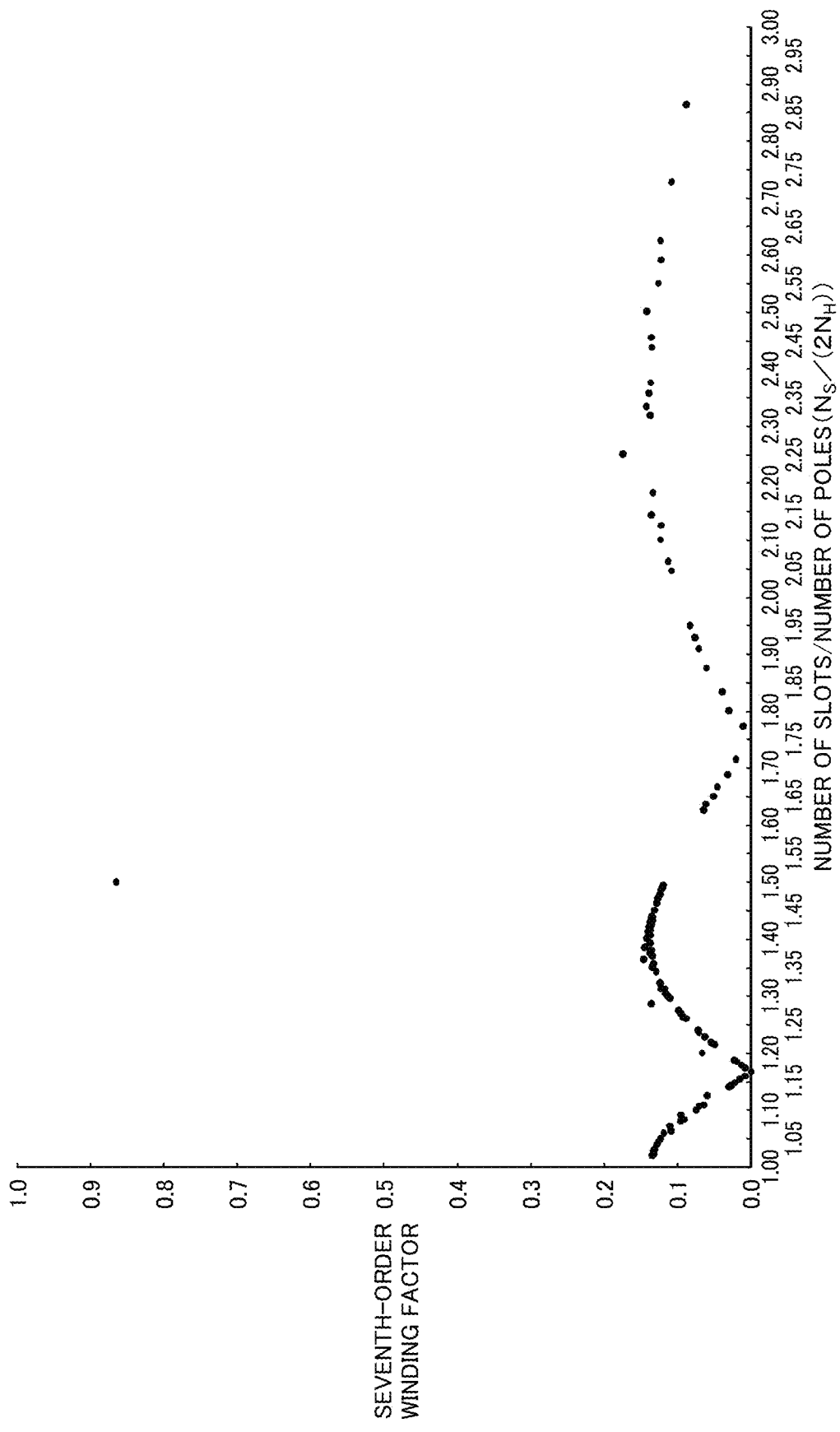
FIG. 6 is a graph schematically showing a relation between the number of slots/the number of poles and a seventh-order winding factor according to the first embodiment.

As shown in FIGS. 5 and 6, however, in a case where $N_S/(2N_H)$ is 1.5, the fifth-order winding factor (fifth-order space harmonics) and the seventh-order winding factor (seventh-order space harmonics) are remarkably large. Therefore, there is a possibility that the performance of permanent magnet-type rotary electric machine 100 deteriorates due to space harmonics such as a loss caused by a torque fluctuation width (torque ripples) and harmonic magnetic flux. For example, in a case where the torque fluctuation width is large, permanent magnet-type rotary electric machine 100 pulsates. The pulsation of permanent magnet-type rotary electric machine 100 due to torque fluctuation is called torque pulsation. It is therefore preferable that $N_S/(2N_H)$ be not 1.5.

As shown in FIG. 4, the winding factor×the speed increase/reduction ratio in a case where $N_S/(2N_H)$ is greater than 1.5 and less than 3.0 is greater than the winding factor×speed increase/reduction ratio in a case where $N_S/(2N_H)$ is greater than 1.25 and less than 1.5. Therefore, the case where $N_S/(2N_H)$ is greater than 1.5 and less than 3.0 is more preferable than the case where $N_S/(2N_H)$ is greater than 1.25 and less than 1.5.

In a case where $N_S/(2N_H)$ is 3.0, the number of the plurality of stator slots 13 is identical to the number of stator slots 13 in permanent magnet-type rotary electric machine 100 of a distributed-winding type. Therefore, in a case where $N_S/(2N_H)$ is 3, there is a problem in distributed winding that the large number of the plurality of stator slots 13 causes deterioration in workability on stator coil 14. Further, in a case where $N_S/(2N_H)$ is greater than 3, the workability on stator coil 14 deteriorates as in the case where $N_S/(2N_H)$ is 3. It is therefore not preferable that $N_S/(2N_H)$ be greater than or equal to 3.0.

Next, permanent magnet-type rotary electric machine 100 according to the present embodiment will be described in detail with reference to FIGS. 1, 4, and 7.

Figure 7:
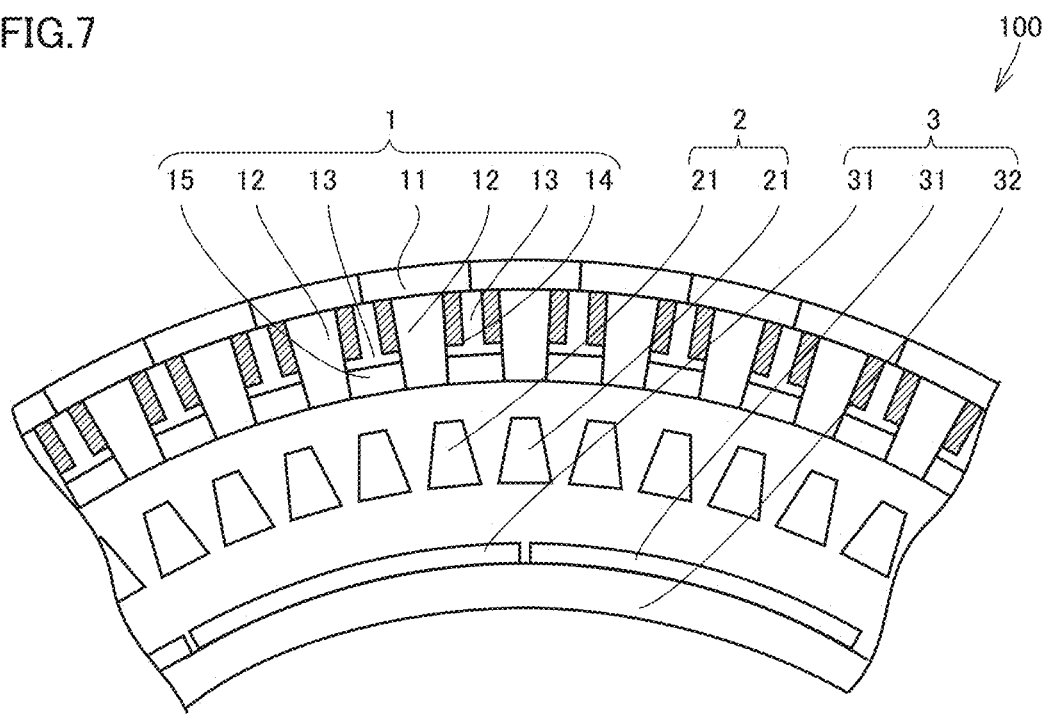
FIG. 7 is an enlarged view of a region VII in FIG. 1.

As illustrated in FIGS. 1 and 7, in permanent magnet-type rotary electric machine 100 according to the present embodiment, a ratio between the number of the plurality of stator slots 13 and the number of poles of the plurality of second pole pieces 31 is 9:4. In permanent magnet-type rotary electric machine 100 according to the present embodiment, $N_S/(2N_H)$ is 2.25. As shown in Table 3, in a case where $N_S/(2N_H)$ is 2.25, the winding factor×the speed increase/reduction ratio is 3.39. Further, in FIG. 4, a point P (2.25) corresponds to a case where $N_S/(2N_H)$ is 2.25.

FIG. 7 is a diagram schematically illustrating a part of permanent magnet-type rotary electric machine 100 according to the first embodiment. Permanent magnet-type rotary electric machine 100 illustrated in FIG. 1 includes, as a whole, a plurality of the parts of permanent magnet-type rotary electric machine 100 illustrated in FIG. 7. Specifically, permanent magnet-type rotary electric machine 100 illustrated in FIG. 1 includes, as a whole, six parts of permanent magnet-type rotary electric machine 100 illustrated in FIG. 7. The part of permanent magnet-type rotary electric machine 100 illustrated in FIG. 7 is periodically arranged.

For example, the number of stator slots 13 included in the part of permanent magnet-type rotary electric machine 100 illustrated in FIG. 7 is 9. Further, the number of second pole pieces 31 included in the part of permanent magnet-type rotary electric machine 100 illustrated in FIG. 7 is 2, so that the number of poles of the part of permanent magnet-type rotary electric machine 100 illustrated in FIG. 7 is 4. Further, the number of the plurality of first pole pieces 21 included in the part of permanent magnet-type rotary electric machine 100 illustrated in FIG. 7 is 11.

Next, actions and effects of the present embodiment will be described.

In permanent magnet-type rotary electric machine 100 according to the first embodiment, as illustrated in FIG. 1, the proportion ($N_S/(2N_H)$) of the number of the plurality of stator slots 13 to the number of poles of the plurality of second pole pieces 31 of second rotor 3 is greater than 1.25 and less than 1.5, or greater than 1.5 and less than 3.0. It is therefore possible to make, as shown in FIG. 4, the winding factor×the speed increase/reduction ratio large. Therefore, the efficiency or power density of permanent magnet-type rotary electric machine 100 sufficiently increases. Further, $N_S/(2N_H)$ is not 1.5. It is therefore possible to prevent the fifth-order winding factor and the seventh-order winding factor from becoming remarkably large. It is therefore possible to prevent the occurrence of torque pulsation due to a loss or the like caused by a torque fluctuation width (torque ripples) and harmonic magnetic flux. It is therefore possible to prevent the performance of permanent magnet-type rotary electric machine 100 from deteriorating.

As illustrated in FIGS. 1 and 7, the ratio between the number of the plurality of stator slots 13 and the number of poles of the plurality of second pole pieces 31 is 9:4. In a case where the ratio between the number of the plurality of stator slots 13 and the number of poles of the plurality of second pole pieces 31 is 9:4, $N_S/(2N_H)$ is 2.25. As shown in FIG. 4, in a range where $N_S/(2N_H)$ is greater than 1.25 and less than 1.5 and a range where $N_S/(2N_H)$ is greater than 1.5 and less than 3.0, the winding factor×the speed increase/reduction ratio is the largest in a case where $N_S/(2N_H)$ is 2.25. Therefore, the efficiency or power density of permanent magnet-type rotary electric machine 100 sufficiently increases.

Second Embodiment

Next, a configuration of a permanent magnet-type rotary electric machine 100 according to a second embodiment will be described with reference to FIGS. 4 and 8. The second embodiment is the same in configuration, and actions and effects as the first embodiment unless otherwise specified. Therefore, the same components as the components according to the first embodiment are denoted by the same reference numerals to avoid the description from being redundant.

Figure 8:
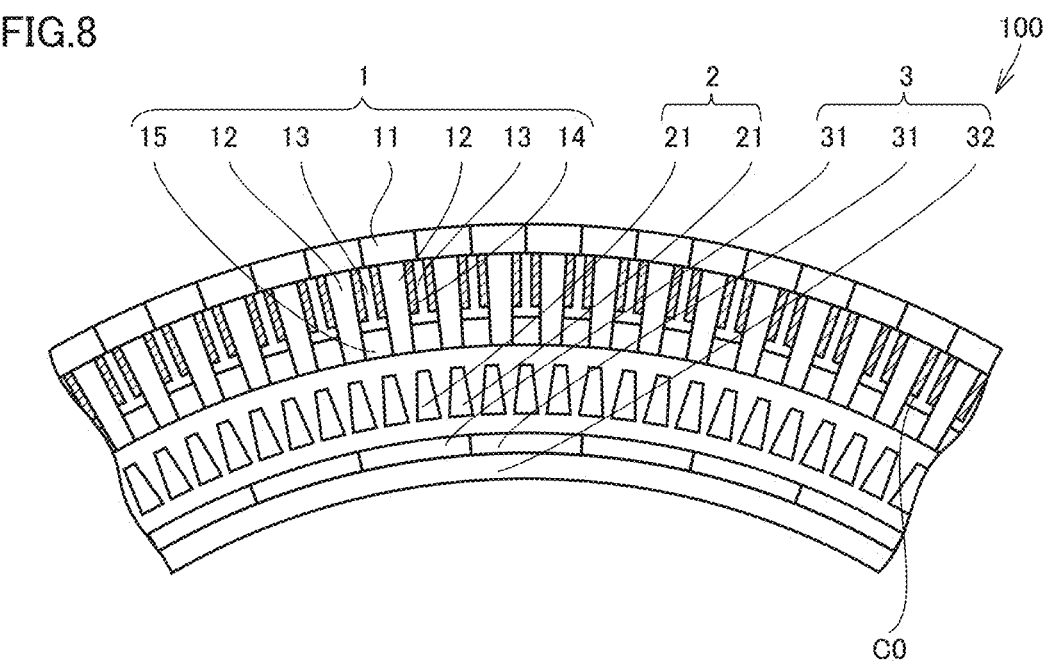
FIG. 8 is a schematic diagram schematically illustrating a configuration of a permanent magnet-type rotary electric machine according to a second embodiment.

As illustrated in FIG. 8, in permanent magnet-type rotary electric machine 100 according to the second embodiment, a ratio between the number of the plurality of stator slots 13 and the number of poles of the plurality of second pole pieces 31 is 18:14. As shown in Table 2, $N_S/(2N_H)$ according to the present embodiment is 1.286. Note that, in FIG. 4, a point P (1.286) corresponds to a case where the ratio between the number of the plurality of stator slots 13 and the number of poles of the plurality of second pole pieces 31 is 18:14. FIG. 8 is a diagram schematically illustrating a part of permanent magnet-type rotary electric machine 100 according to the second embodiment. Permanent magnet-type rotary electric machine 100 includes, as a whole, a plurality of the parts of permanent magnet-type rotary electric machine 100 illustrated in FIG. 8.

For example, the number of stator slots 13 included in the part of permanent magnet-type rotary electric machine 100 illustrated in FIG. 8 is 18. Further, the number of second pole pieces 31 included in the part of permanent magnet-type rotary electric machine 100 illustrated in FIG. 8 is 7, so that the number of poles of the part of permanent magnet-type rotary electric machine 100 illustrated in FIG. 8 is 14. Further, the number of first pole pieces 21 included in the part of permanent magnet-type rotary electric machine 100 illustrated in FIG. 8 is 25.

In the present embodiment, stator coil 14 includes a plurality of coil portions C0. The plurality of coil portions C0 are connected in parallel to each other. One coil portion C0 is wound around each of 18 stator teeth 12 as a concentrated winding. Therefore, a parallel circuit is configured every 18 stator teeth 12. Thus, the induced voltage is equal for every 18 stator teeth 12. The part of permanent magnet-type rotary electric machine 100 illustrated in FIG. 8 includes one coil portion C0 of the plurality of coil portions C0. Note that, in the part of permanent magnet-type rotary electric machine 100 illustrated in FIG. 8, one coil portion C0 of the plurality of coil portions C0 is illustrated.

Next, the specific number of stator slots 13 and the specific number of poles of second pole pieces 31 of second rotor 3 in a case where $N_S/(2N_H)$ is greater than 1.25 and less than 1.5 will be considered. Permanent magnet-type rotary electric machine 100 is permanent magnet-type rotary electric machine 100 of a three-phase winding type. Therefore, the number of the plurality of stator slots 13 is a multiple of 3. Further, since one second pole piece 31 includes two poles, the number of poles of the plurality of second pole pieces 31 of second rotor 3 is a multiple of 2 (even number). Therefore, in a case where $N_S/(2N_H)$ is greater than or equal to 1.25 in a range where $N_S/(2N_H)$ is greater than 1.25 and less than 1.5, the specific number of stator slots 13 is large.

For example, the minimum number of stator slots 13 for making $N_S/(2N_H)$ equal to 1.45 is 87, and the number of poles of second pole pieces 31 is 60 (the number of second pole pieces 31 is 30). In this case, each of the plurality of coil portions C0 is periodically arranged every 87 slots.

The number of turns of one coil portion C0 around one stator tooth 12 needs to be an integer, so that the larger the number of the plurality of stator slots 13, the smaller the degree of freedom in designing the winding of coil portion C0. Further, in a case where the number of the plurality of parallel circuits by each of the plurality of coil portions C0 is large, the number of turns of each of the plurality of coil portions C0 becomes small.

Further, in a case where the induced voltage is different between the plurality of parallel circuits, a circulating current occurs in the plurality of parallel circuits, so that the efficiency of permanent magnet-type rotary electric machine 100 deteriorates. It is therefore not possible to increase the number of the plurality of parallel circuits by simply increasing the number of the plurality of coil portions C0. It is therefore difficult to suppress a decrease in the degree of freedom in designing the windings of the plurality of coil portions C0 by increasing the number of the plurality of parallel circuits.

As described above, in permanent magnet-type rotary electric machine 100 in which $N_S/(2N_H)$ is 1.45, for example, the degree of freedom in designing the windings is lower than in a case where the ratio between the number of stator slot 13 and the number of poles of second pole pieces 31 is 12:10 ($N_S/(2N_H)$ is 1.20).

Table 4 shows phases and phase angles of coil portions C0 wound around the plurality of stator teeth 12 according to the present embodiment.

TABLE 4

| Tooth number | Phase | Phase (angle) | Winding direction |
|---|---|---|---|
| T101 | U | 0 | Forward direction |
| T102 | V | 140 | Forward direction |
| T103 | V | 280 | Reverse direction |
| T104 | W | 60 | Reverse direction |
| T105 | U | 200 | Reverse direction |
| T106 | U | 340 | Forward direction |
| T107 | V | 120 | Forward direction |
| T108 | W | 260 | Forward direction |
| T109 | W | 40 | Reverse direction |
| T110 | U | 180 | Reverse direction |
| T111 | V | 320 | Reverse direction |
| T112 | V | 100 | Forward direction |
| T113 | W | 240 | Forward direction |
| T114 | U | 20 | Forward direction |
| T115 | U | 160 | Reverse direction |
| T116 | V | 300 | Reverse direction |
| T117 | W | 80 | Reverse direction |
| T118 | W | 220 | Forward direction |

Figure 9:
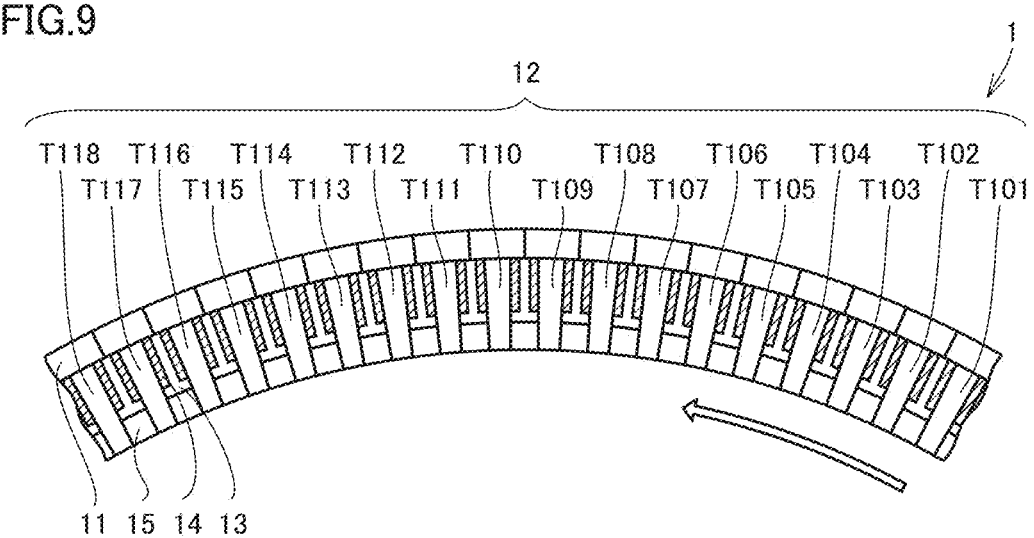
FIG. 9 is a schematic diagram schematically illustrating a configuration of a stator of the permanent magnet-type rotary electric machine according to the second embodiment.

As illustrated in FIG. 9 and shown in Table 4, in the present embodiment, the plurality of stator teeth 12 includes a first stator tooth T101 to an eighteenth stator tooth T118. First stator tooth T101 to eighteenth stator tooth T118 are each offset in phase from the others by 140 degrees. In the present embodiment, three-phase currents including a U phase, a V phase, and a W phase flow through the plurality of coil portions C0. Further, the plurality of coil portions C0 we wound around stator teeth 12 in the forward direction or the reverse direction. The direction of a rotating magnetic field generated by the three-phase current is indicated by a hollow arrow.

As shown in Table 4, stator teeth 12 adjacent to each other are each offset in phase from the others by 140 degrees. Therefore, the total phase offset among 18 stator teeth 12 is 2520 degrees. 2520 is a multiple of 360. Therefore, the current phase becomes the same every 18 stator teeth 12, so that the induced voltage become the same every 18 stator teeth 12. It is therefore possible to prevent the occurrence of a circulating current in the plurality of parallel circuits.

Next, actions and effects of the present embodiment will be described.

As illustrated in FIG. 8, in permanent magnet-type rotary electric machine 100 according to the second embodiment, the ratio between the number of the plurality of stator slots 13 and the number of poles of the plurality of second pole pieces 31 is 18:14. Since the number of the plurality of stator slots 13 is small, it is therefore possible to suppress a decrease in the degree of freedom in designing the windings. Further, a parallel circuit is configured every 18 stator teeth 12. It is therefore possible to prevent the occurrence of a circulating current.

Third Embodiment

Next, a configuration of a permanent magnet-type rotary electric machine 100 according to a third embodiment will be described with reference to FIGS. 10 and 11. The third embodiment is the same in configuration, and actions and effects as the second embodiment unless otherwise specified. Therefore, the same components as the components according to the second embodiment are denoted by the same reference numerals to avoid the description from being redundant.

Figure 10:
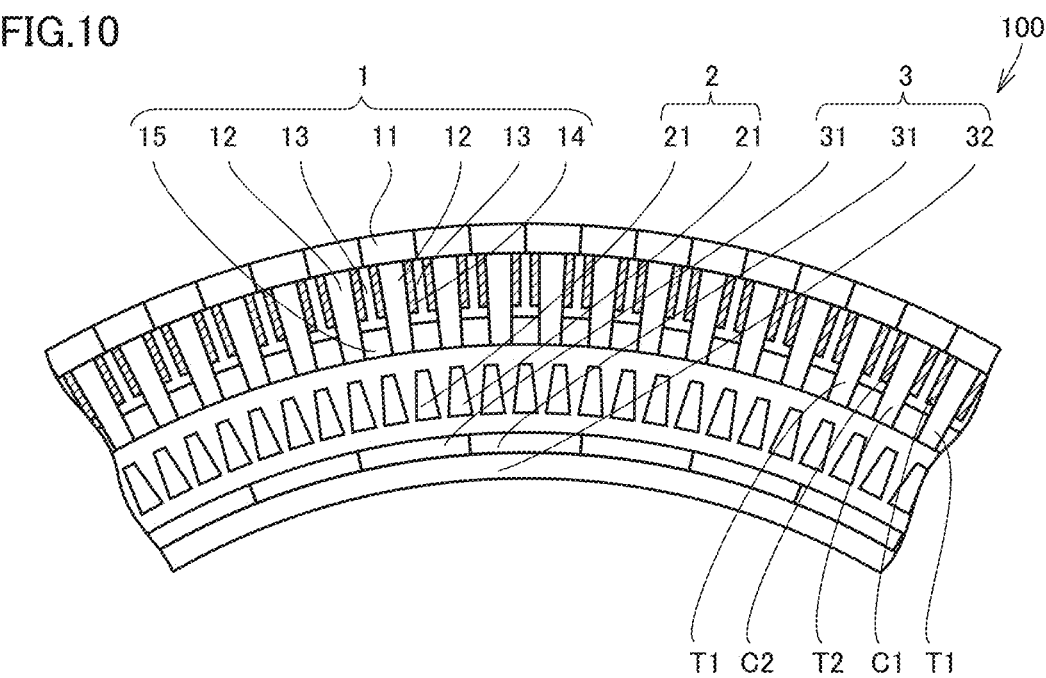
FIG. 10 is a schematic diagram schematically illustrating a configuration of a permanent magnet-type rotary electric machine according to a third embodiment.

As illustrated in FIG. 10, in permanent magnet-type rotary electric machine 100 according to the third embodiment, stator coil 14 includes a first coil portion C1 and a second coil portion C2. In the present embodiment, the plurality of coil portions C0 each include first coil portion C1 and second coil portion C2. Second coil portion C2 is connected in parallel to first coil portion C1.

The plurality of stator teeth 12 includes a plurality of first tooth portions T1 and a plurality of second tooth portions T2. First coil portion C1 is wound around each of the plurality of first tooth portions T1. Second coil portion C2 is wound around each of the plurality of second tooth portions T2. The number of the plurality of first tooth portions T1 is identical to the number of the plurality of second tooth portions T2. Each of the plurality of first tooth portions T1 and each of the plurality of second tooth portions T2 are alternately arranged.

Figure 11:
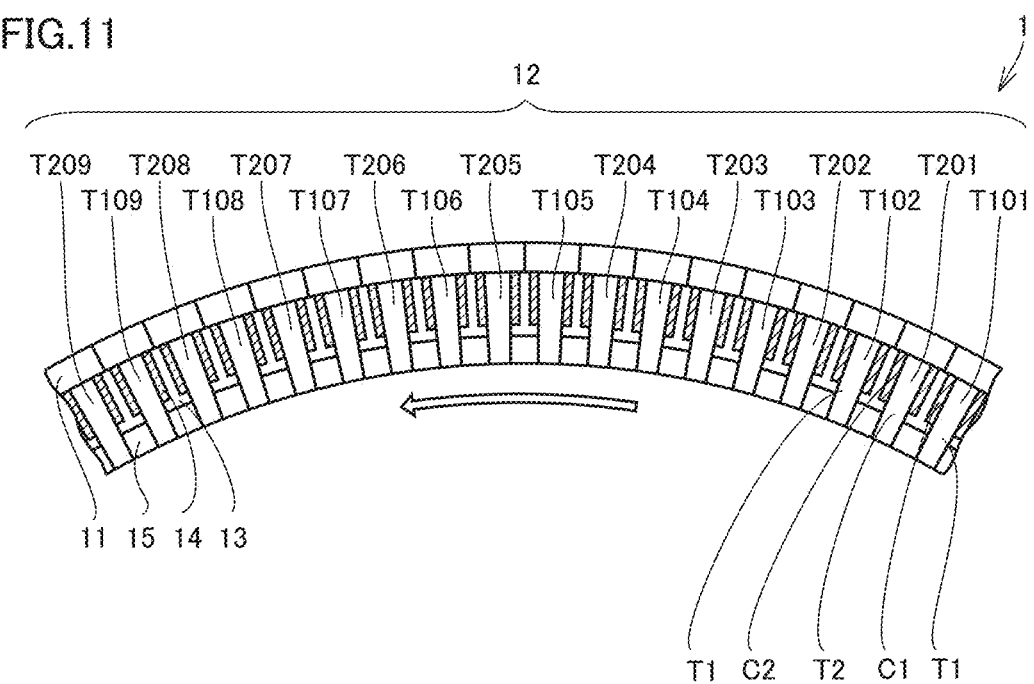
FIG. 11 is a schematic diagram schematically illustrating a configuration of a stator of the permanent magnet-type rotary electric machine according to the third embodiment.

As illustrated in FIG. 11, the plurality of first tooth portions T1 include a first first tooth portion T101 to a ninth first tooth portion T109. The plurality of second tooth portions T2 include a first second tooth portion T201 to a ninth second tooth portion T209. The number of first tooth portions T1 and the number of second tooth portions 12 are each a multiple of 9.

In the present embodiment, first coil portion C1 and second coil portion C2 each constitutes a parallel circuit. Therefore, one coil portion C0 includes two parallel circuits.

The current of each phase of a first group is equal in phase relationship to the current of each phase of a second group. Note that the first group includes the plurality of first tooth portions T1 and the plurality of first coil portions C1. The second group includes the plurality of second tooth portions T2 and the plurality of second coil portions C2. As shown in Table 5, for example, the phases of the U-phase current of the first group are 0 degrees, 200 degrees, and 160 degrees.

TABLE 5

| Tooth number | Group | Phase | Phase (angle) | Winding direction |
|---|---|---|---|---|
| T101 | 1 | U | 0 | Forward direction |
| T201 | 2 | V | 140 | Forward direction |
| T102 | 1 | V | 280 | Reverse direction |
| T202 | 2 | W | 60 | Reverse direction |
| T103 | 1 | U | 200 | Reverse direction |
| T203 | 2 | U | 340 | Forward direction |
| T104 | 1 | V | 120 | Forward direction |
| T204 | 2 | W | 260 | Forward direction |
| T105 | 1 | W | 40 | Reverse direction |
| T205 | 2 | U | 180 | Reverse direction |
| T106 | 1 | V | 320 | Reverse direction |
| T206 | 2 | V | 100 | Forward direction |
| T107 | 1 | W | 240 | Forward direction |
| T207 | 2 | U | 20 | Forward direction |
| T108 | 1 | U | 160 | Reverse direction |
| T208 | 2 | V | 300 | Reverse direction |
| T109 | 1 | W | 80 | Reverse direction |
| T209 | 2 | W | 220 | Forward direction |

Further, the phases of the U-phase current of the second group are 340 degrees, 180 degrees, and 20 degrees. Therefore, the total induced voltages are equal to each other. This prevents the parallel circuits belonging to the first group and the parallel circuits belonging to the second group from being different in phase from each other. It is therefore, possible to prevent the occurrence of a circulating current.

Next, actions and effects of the present embodiment will be described.

In the permanent magnet-type rotary electric machine 100 according to the third embodiment, as illustrated in FIG. 10, each of the plurality of first tooth portions T1 and each of the plurality of second tooth portions T2 are alternately arranged. Therefore, as shown in Table 5, the induced voltage of first coil portions C1 wound around the plurality of first tooth portions T1 is equal to the induced voltage of second coil portions C2 wound around the plurality of second tooth portions T2. It is therefore possible to prevent the occurrence of a circulating current.

As illustrated in FIG. 10, stator coil 14 includes first coil portion C1 and second coil portion C2. First coil portion C1 and second coil portion C2 each constitutes a parallel circuit. It is therefore possible to increase the number of parallel circuits included in permanent magnet-type rotary electric machine 100 as compared with a case where stator coil 14 constitutes one parallel circuit.

Fourth Embodiment

Next, a configuration of a permanent magnet-type rotary electric machine 100 according to a fourth embodiment will be described with reference to FIG. 12. The fourth embodiment is the same in configuration, and actions and effects as the third embodiment unless otherwise specified. Therefore, the same components as the components according to the third embodiment are denoted by the same reference numerals to avoid the description from being redundant.

Figure 12:
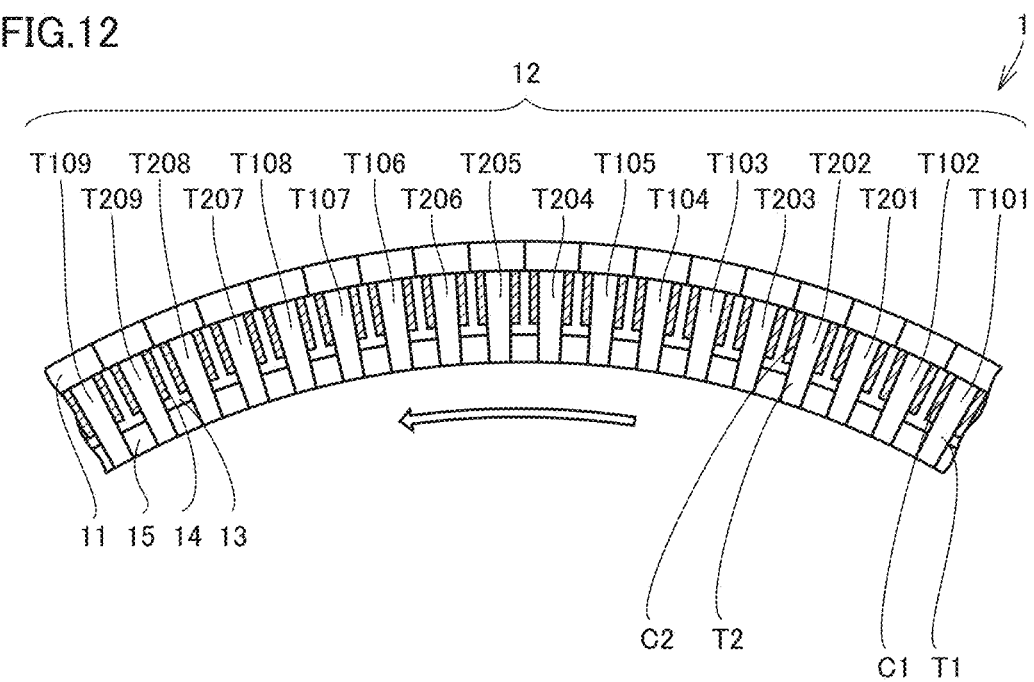
FIG. 12 is a schematic diagram schematically illustrating a configuration of a stator of a permanent magnet-type rotary electric machine according to a fourth embodiment.

As illustrated in FIG. 12, in permanent magnet-type rotary electric machine 100 according to the fourth embodiment, three of the plurality of first tooth portions T1 and three of the plurality of second tooth portions T2 are alternately arranged.

The current of each phase of the first group is equal in phase to the current of each phase of the second group. As shown in Table 6, for example, the phases of the U-phase current of the first group are 0 degrees, 340 degrees, and 20 degrees.

TABLE 6

| Tooth number | Group | Phase | Phase (angle) | Winding direction |
| --- | --- | --- | --- | --- |
| T101 | 1 | U | 0 | Forward direction |
| T102 | 1 | V | 140 | Forward direction |
| T201 | 2 | V | 280 | Reverse direction |
| T202 | 2 | W | 60 | Reverse direction |
| T203 | 2 | U | 200 | Reverse direction |
| T103 | 1 | U | 340 | Forward direction |
| T104 | 1 | V | 120 | Forward direction |
| T105 | 1 | W | 260 | Forward direction |
| T204 | 2 | W | 40 | Reverse direction |
| T205 | 2 | U | 180 | Reverse direction |
| T206 | 2 | V | 320 | Reverse direction |
| T106 | 1 | V | 100 | Forward direction |
| T107 | 1 | W | 240 | Forward direction |
| T108 | 1 | U | 20 | Forward direction |
| T207 | 2 | U | 160 | Reverse direction |
| T208 | 2 | V | 300 | Reverse direction |
| T209 | 2 | W | 80 | Reverse direction |
| T109 | 1 | W | 220 | Forward direction |

The phases of the U-phase current of the second group are 200 degrees, 180 degrees, and 160 degrees. Therefore, the total U-phase induced voltage of the first group is equal to the total U-phase induced voltage of the second group. This prevents the parallel circuits belonging to the first group and the parallel circuits belonging to the second group from being different in phase from each other. It is therefore possible to prevent the occurrence of a circulating current.

Next, actions and effects of the present embodiment will be described.

As illustrated in FIG. 12, in permanent magnet-type rotary electric machine 100 according to the fourth embodiment, three of the plurality of first tooth portions T1 and three of the plurality of second tooth portions T2 are alternately arranged. Therefore, as shown in Table 6, the induced voltage of first coil portions C1 wound around the plurality of first tooth portions T1 is equal to the induced voltage of second coil portions C2 wound around the plurality of second tooth portions T2. It is therefore possible to prevent the occurrence of a circulating current.

As illustrated in FIG. 12, stator coil 14 includes first coil portion C1 and second coil portion C2. First coil portion C1 and second coil portion C2 each constitutes a parallel circuit. It is therefore possible to increase the number of parallel circuits included in permanent magnet-type rotary electric machine 100 as compared with a case where stator coil 14 constitutes one parallel circuit.

Fifth Embodiment

Next, a configuration of a permanent magnet-type rotary electric machine 100 according to a fifth embodiment will be described with reference to FIGS. 13 and 14. A third group includes a plurality of third tooth portions T3 and a plurality of third coil portions C3. The fifth embodiment is the same in configuration, and actions and effects as the third embodiment unless otherwise specified. Therefore, the same components as the components according to the third embodiment are denoted by the same reference numerals to avoid the description from being redundant.

According to the third and fourth embodiments, two parallel circuits are configured every 18 stator coils 14. In a case where permanent magnet-type rotary electric machine 100 includes only one power supply, it is, however, difficult to configure three parallel circuits every 18 stator coils 14.

Figure 13:
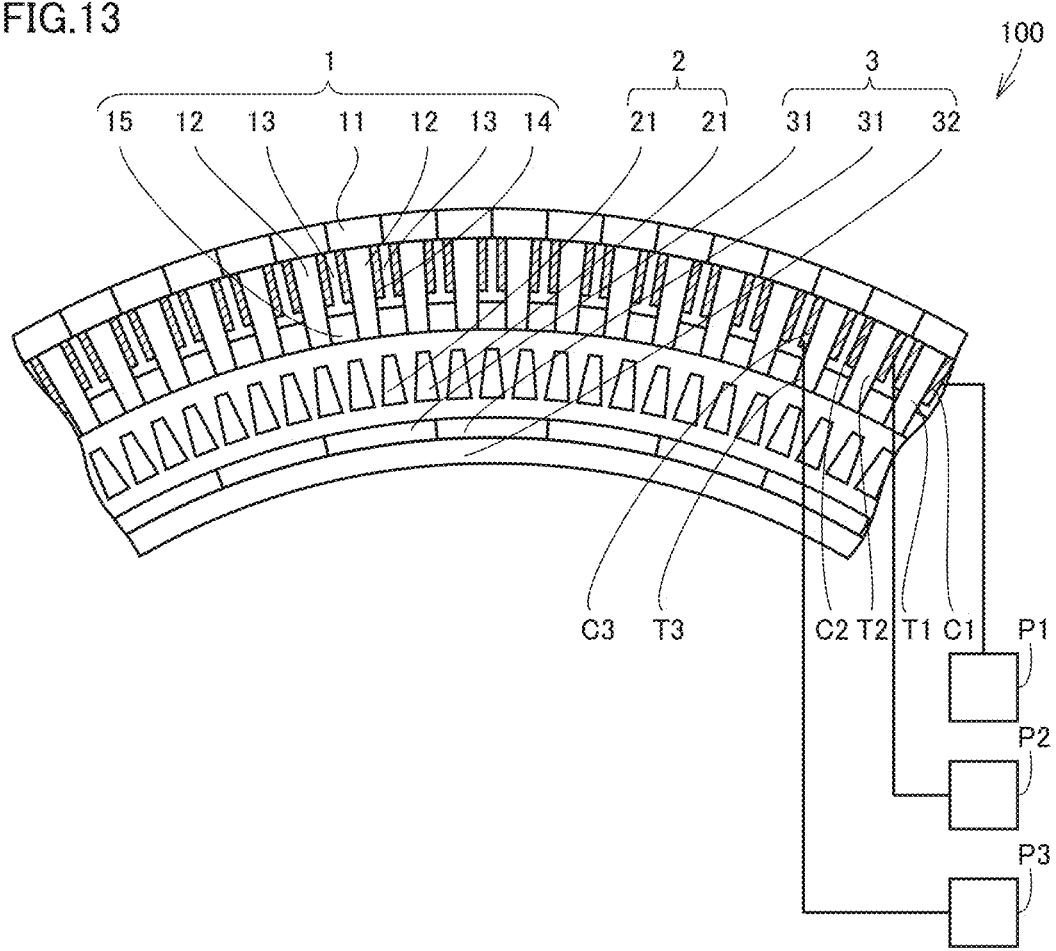
FIG. 13 is a schematic diagram schematically illustrating a configuration of a permanent magnet-type rotary electric machine according to a fifth embodiment.

As illustrated in FIG. 13, in permanent magnet-type rotary electric machine 100 according to the fifth embodiment, permanent magnet-type rotary electric machine 100 further includes a first power supply P1, a second power supply P2, and a third power supply P3. First power supply P1, second power supply P2, and third power supply P3 are separate from each other. First power supply P1, second power supply P2, and third power supply P3 are each offset in phase from the others by 20 degrees.

The plurality of stator teeth 12 includes the plurality of first tooth portions T1, the plurality of second tooth portions T2, and the plurality of third tooth portions T3. The plurality of first tooth portions T1 are electrically connected to first power supply P1. The plurality of second tooth portions T2 are electrically connected to second power supply P2. The plurality of third tooth portions T3 are electrically connected to third power supply P3. Each of the plurality of first tooth portions T1, each of the plurality of second tooth portions T2, and each of the plurality of third tooth portions T3 are connected to stator core 11 in a cyclical manner.

Stator coil 14 includes first coil portion C1, second coil portion C2, and third coil portion C3. Third coil portion C3 is wound around each of the plurality of third tooth portions T3 as a concentrated winding.

As illustrated in FIG. 14, the plurality of first tooth portions T1 include a first first tooth portion T101 to a sixth first tooth portion T106. The plurality of second tooth portions 12 include a first second tooth portion T201 to a sixth second tooth portion 1206. The plurality of third tooth portions T3 include a first third tooth portion T301 to a sixth third tooth portion T306.

TABLE 7

| Tooth number | Group | Phase | Phase (angle) | Winding direction |
|---|---|---|---|---|
| T101 | 1 | U | 0 | Forward direction |
| T201 | 2 | V | 140 | Forward direction |
| T301 | 3 | V | 280 | Reverse direction |
| T102 | 1 | W | 60 | Reverse direction |
| T202 | 2 | U | 200 | Reverse direction |
| T302 | 3 | U | 340 | Forward direction |
| T103 | 1 | V | 120 | Forward direction |
| T203 | 2 | W | 260 | Forward direction |
| T303 | 3 | W | 40 | Reverse direction |
| T104 | 1 | U | 180 | Reverse direction |
| T204 | 2 | V | 320 | Reverse direction |
| T304 | 3 | V | 100 | Forward direction |
| T105 | 1 | W | 240 | Forward direction |
| T205 | 2 | U | 20 | Forward direction |
| T305 | 3 | U | 160 | Reverse direction |
| T106 | 1 | V | 300 | Reverse direction |
| T206 | 2 | W | 80 | Reverse direction |
| T306 | 3 | W | 220 | Forward direction |

The current of each phase of the first group is offset in phase from the current of each phase of the second group and the current of each phase of the third group. For example, the phases of the U-phase current of the first group are 0 degrees and 180 degrees. Further, the phases of the U-phase current of the second group are 200 degrees and 20 degrees. Further, the phases of the U-phase current of the third group are 340 degrees and 160 degrees. Therefore, the U-phase current of the second group is offset in phase by 20 degrees from the U-phase current of the first group. Further, the U-phase current of the third group is offset in phase by 20 degrees from the U-phase current of the first group. That is, the first group is offset by 20 degrees from the second group and the third group.

Next, actions and effects of the present embodiment will be described.

In permanent magnet-type rotary electric machine 100 according to the fifth embodiment, first power supply P1, second power supply P2, and third power supply P3 are each offset in phase from the others by 20 degrees. Therefore, the phase offset of 20 degrees among the first group, the second group, and the third group is canceled out by the offset among first power supply P1, second power supply P2, and third power supply P3. This makes the first group, the second group, and the third group equal in phase to each other. It is therefore possible to constitute three parallel circuits every 18 stator teeth 12.

It should be understood that the embodiments disclosed herein are illustrative in all respects and not restrictive. The scope of the present disclosure is defined by the claims rather than the above description, and the present disclosure is intended to include the claims, equivalents of the claims, and all modifications within the scope.

REFERENCE SIGNS LIST

1: stator, 2: first rotor, 3: second rotor, 11: stator core, 12: stator teeth, 13: stator slot, 14: stator coil, 15: stator magnet, 21: first pole piece, 31: second pole piece, 100: permanent magnet-type rotary electric machine, C1: first coil portion, C2: second coil portion, P1: first power supply, P2: second power supply, P3: third power supply, T1: first tooth portion, T2: second tooth portion

The invention claimed is:

1. A permanent magnet-type rotary electric machine comprising:
   a stator including a stator core extending annularly, a plurality of stator teeth protruding from the stator core toward a center of the stator core, a plurality of stator slots each provided between adjacent stator teeth of the plurality of stator teeth, a plurality of stator magnets each installed in a corresponding one of the plurality of stator slots, and a stator coil wound around each of the plurality of stator teeth;
   a first rotor including a plurality of first pole pieces arranged along a circumferential direction of the stator core with a space from the stator, the first rotor being disposed inside the stator core relative to the plurality of stator magnets; and
   a second rotor including a plurality of second pole pieces arranged along the circumferential direction of the stator core with a space from the first rotor and having a permanent magnet, the second rotor being disposed inside the stator core relative to the plurality of first pole pieces,
   wherein the stator coil is wound around each of the stator teeth as a concentrated winding,
   a relation $N_L = N_S + N_H$ is satisfied, where $N_S$ is a number of the stator slots, $N_L$ is a number of the first pole pieces of the first rotor, and $N_H$ is a number of the second pole pieces of the second rotor, and
   a first value of a winding factor multiplied by a speed increase/decrease when a proportion of a number of the plurality of stator slots to a number of poles of the plurality of second pole pieces of the second rotor is greater than 1.25 and less than 1.5, or greater than 1.5 and less than 3.0 is smaller than a second value of the winding factor multiplied by the speed increase/decrease ratio when $N_S/N_H = 1.5$.

2. The permanent magnet-type rotary electric machine according to claim 1, wherein a ratio between the number of the plurality of stator slots and the number of poles of the plurality of second pole pieces is 9:4.

3. The permanent magnet-type rotary electric machine according to claim 1, wherein a ratio between the number of the plurality of stator slots and the number of poles of the plurality of second pole pieces is 18:14.

4. The permanent magnet-type rotary electric machine according to claim 3, wherein
   the stator coil includes a first coil portion and a second coil portion connected in parallel to the first coil portion, and
   the plurality of stator teeth include a plurality of first tooth portions each wound by the first coil portion and a plurality of second tooth portions each wound by the second coil portion,
   a number of the plurality of first tooth portions is identical to a number of the plurality of second tooth portions, and
   each of the plurality of first tooth portions and each of the plurality of second tooth portions are alternately arranged.

5. The permanent magnet-type rotary electric machine according to claim 3, wherein
   the stator coil includes a first coil portion and a second coil portion connected in parallel to the first coil portion, and the plurality of stator teeth include a plurality of first tooth portions each wound by the first coil portion and a plurality of second tooth portions each wound by the second coil portion, a number of the plurality of first tooth portions is identical to a number of the plurality of second tooth portions, and three of the plurality of first tooth portions and three of the plurality of second tooth portions are alternately arranged.

6. The permanent magnet-type rotary electric machine according to claim 3, further comprising:

a first power supply;

a second power supply; and a third power supply, wherein the plurality of stator teeth include a plurality of first tooth portions electrically connected to the first power supply, a plurality of second tooth portions electrically connected to the second power supply, and a plurality of third tooth portions electrically connected to the third power supply, each of the plurality of first tooth portions, each of the plurality of second tooth portions, and each of the plurality of third tooth portions are connected to the stator core in a cyclical manner, and the first power supply, the second power supply, and the third power supply are each offset in phase from others by 20 degrees.

7. The permanent magnet-type rotary machine according to claim 1, wherein the first value is greater than a third value of the winding factor multiplied by the speed increase/decrease ratio when $N_S/N_H=1.2$.

* * * * *